Jan. 27, 1953     G. C. FOLMER     2,626,478
ARTIFICIAL BAIT
Filed Jan. 18, 1951
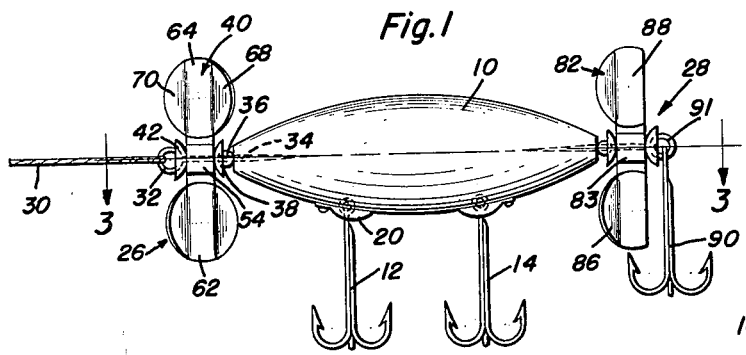
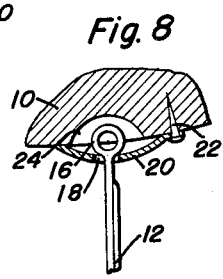
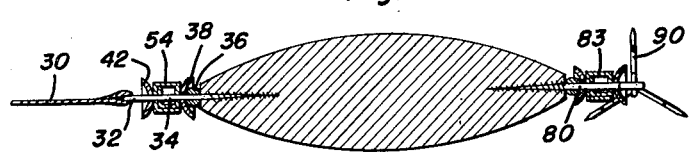
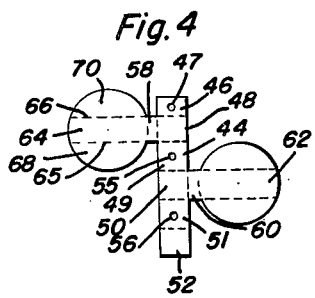
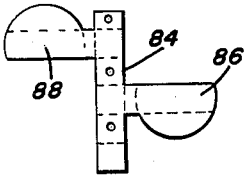
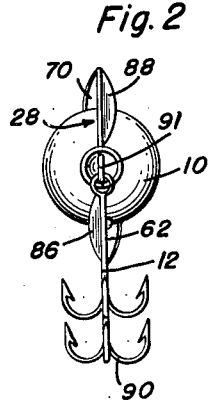
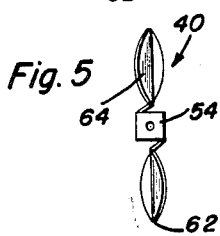
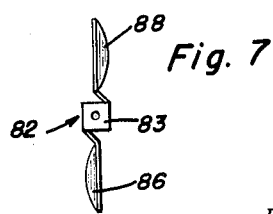
George C. Folmer
INVENTOR.
BY *Clarence A. O'Brien*
*and Harvey B. Jackson*
Attorneys Patented Jan. 27, 1953

2,626,478

UNITED STATES PATENT OFFICE 2,626,478

ARTIFICIAL BAIT

George C. Folmer, Allentown, Pa.

Application January 18, 1951, Serial No. 206,656

1 Claim. (Cl. 43—42.19)

This invention relates to improvements in fish lures.

An object of this invention is to provide an improved fish lure which has a propeller or spinner at the front end thereof with blades so shaped as to cause the propeller to rotate in one direction as the lure body is pulled through the water, together with a propeller or spinner at the rear end of the body, the blades of which are of such an angle of pitch that the propeller or spinner rotates in a direction opposite from the direction of rotation of the front or forward spinner.

Another object of this invention is to provide an improved construction of spinner for the front and rear of the lure body.

Ancillary objects and features of importance will become apparent in following the description of the illustrated form of the invention.

In the drawings:

Figure 1 is an elevational view of the device;

Figure 2 is a front view of the device in Figure 1;

Figure 3 is a horizontal sectional view on the line 3—3 of Figure 1;

Figure 4 is a plan view of the blank from which the propeller for the front of the lure is shaped;

Figure 5 is a front view of the front propeller of the lure;

Figure 6 is a blank from which the rear propeller is made;

Figure 7 is a front view of the rear propeller of the lure; and

Figure 8 is an enlarged fragmentary sectional view showing the means of attachment of the fish-hooks and the lure body.

As I have illustrated in the drawings, there is a lure body 10 preferably tapered at the front and rear ends thereof and made of suitable, standard material. Fish-hooks 12 and 14 having eyes 16 at their upper end are attached to the lure body 10 by standard means such as a pin passed through the eye 16 or by being fitted in an aperture 18 sufficiently small to prevent the eye 16 from passing through it in order that the hook 12 or the hook 14 be separated inadvertently from the lure 10. A plate 20 which is preferably concavo-convex in shape is attached, by standard means, such as the nail 22 or a screw, to the lure body 10 and covers a well 24 in which the eye 16 is disposed. More or less hooks may be provided on the lure body 10 as found desirable or expedient.

There is a front propeller or spinner assembly 26 on the lure body and a rear propeller or spinner assembly 28 at the back end of the body 10. The front assembly includes a fish line 30 which is tied or otherwise fastened to the eye 32 of a screw or nail, preferably the former, 34 which is secured to the body along the central axis and parallel to said axis of the body. The shank of the screw 34 is provided with a spacer 36 which bears against the front end of the body 10, and a concavo-convex bearing 38 which has its concave side located upon the bearing 36. A propeller 40 which constitutes a spinner and which is rotated by forward movement of the lure through the water, is disposed on the shank of the screw 34 and there is a concavo-convex baffle 42 on the shank in which a part of the eye 32 is disposed.

The propeller or spinner 40 is made from a blank substantially as disclosed in Figure 4. There is a longitudinal rectangular strip 44 which is provided with transverse fold lines. The first fold line separates the upper end of the rectangular strip 44 into a section 46 which is provided with an opening 47. The next fold line separates the portion 48 from the remainder of the strip, while the next fold lines separate the remainder of the strip into substantially square portions 49, 50, 51 and 52. All of the portions are bent to right angles to the next adjacent portion so as to constitute the substantially rectangular hub 54 (Figure 3). The hole 47 is in alignment with holes 55, 56 which are formed in the sections 49 and 52 to allow the shank 34 of the screw to pass through them, thereby mounting the hub for rotation.

A lateral extension 58 of the portion 48 is provided on one edge thereof, and there is a lateral extension 60 extending from the opposite edge of the section 50. The extensions 58 and 60 are adapted to be bent at right angles to their sections so that the substantially circular blades 62 and 64 are in general alignment with each other. Each blade is provided with two fold lines 65 and 66 which are parallel to each other and which define chords of the circular blade 64, thereby leaving a center section together with leading and trailing edge sections 68 and 70. The leading edge section 68 is bent along the fold line 65 in one direction, while the trailing edge section of one-half of the propeller is bent in the opposite direction along the fold line 66. The same construction applies insofar as the propeller blade 62 is concerned. However, the leading and trailing sections are so arranged that when the lure body 10 is drawn through the water, the propeller 40 will rotate in one direction.

The rear assembly 28 includes a screw 80 with an identical bearing and baffle construction. The propeller blade 82 is provided with a substantially cubical hub 83 and is made from a blank 84 which is almost identical to the blank 44. The only differentiating feature of the blank 84 from the blank 44 is in the blades 86 and 88, the trailing edge sections of each being omitted to prevent interference from the fish-hook 90 which is carried by the eye 91 of the shank 80. The leading and trailing edge sections of the propeller are bent to impart movement to the propeller 82 in a direction opposite to the direction of rotation of the propeller 40.

In operation, the lure body 10 is pulled through the water by means of a fish line 30 which may employ a leader as a part of standard equipment. The relative movement of the lure body in the water causes the propeller 40 to rotate in one direction. However, due to the pitch of the blades of the rear propeller 82, it rotates in a direction opposite to the direction of rotation of the propeller.

Having described the invention, what is claimed as new is:

As a new article of manufacture, a fish lure spinner comprising a blank of sheet metal including an elongated rectangular body portion having a plurality of spaced parallel transverse fold lines, said fold lines dividing the body portion into first, second, third, fourth, fifth and sixth areas, the first, third and fifth areas each having a central aperture therein so that when adjacent sections are bent relatively perpendicular to form a substantially square hub-forming sleeve with the fifth area over-lapping the first area and with the sixth area overlapping the second area, the apertures will be in registry with each other to receive a supporting rod, a first blade-forming plate member having a lateral projection formed with one longitudinal edge of the body portion at the area between the first two areas having the apertures, and a second blade-forming plate member formed with the other longitudinal edge of the body portion at the area between the second and third areas having the apertures therein, each of said plate members having a fold line disposed perpendicular to the body, the fold line of the first plate member being aligned with the fold line between the first and second areas and the fold line of the second plate member being aligned with the fold line between the fourth and fifth areas.

GEORGE C. FOLMER.

REFERENCES CITED

The following references are of record in the file of this patent:

UNITED STATES PATENTS

| Number | Name | Date |
|---|---|---|
| 456,931 | Angell | Aug. 4, 1891 |
| 661,869 | Henkenius | Nov. 13, 1900 |
| 967,660 | Pedersen | Aug. 16, 1910 |
| 1,218,835 | Bower | Mar. 13, 1917 |
| 1,427,147 | Barsch | Aug. 29, 1922 |
| 1,836,650 | Davenport | Dec. 15, 1931 |
| 1,876,693 | Kraft | Sept. 13, 1932 |
| 1,920,935 | Khoenle | Aug. 1, 1933 |
| 2,079,335 | Pflueger | May 4, 1937 |
| 2,184,792 | Clarke | Dec. 26, 1939 |
| 2,255,004 | Rodanet | Sept. 2, 1941 |